United States Patent
Kato et al.

(10) Patent No.: US 11,137,547 B2
(45) Date of Patent: Oct. 5, 2021

(54) WAVELENGTH SELECTIVE FILTER

(71) Applicant: KOHOKU KOGYO CO., LTD., Nagahama (JP)

(72) Inventors: Takashi Kato, Nagahama (JP); Toshihisa Okubo, Nagahama (JP)

(73) Assignee: Kohoku Kogyo Co., Ltd., Nagahama (JP)

( * ) Notice: Subject to any disclaimer, the term of this patent is extended or adjusted under 35 U.S.C. 154(b) by 0 days.

(21) Appl. No.: 16/885,588

(22) Filed: May 28, 2020

(65) Prior Publication Data
US 2020/0379179 A1 Dec. 3, 2020

(30) Foreign Application Priority Data
May 30, 2019 (JP) .............................. JP2019-101514

(51) Int. Cl.
*G02B 6/293* (2006.01)
*G02B 6/42* (2006.01)

(52) U.S. Cl.
CPC ....... *G02B 6/2937* (2013.01); *G02B 6/29368* (2013.01); *G02B 6/422* (2013.01); *G02B 6/4246* (2013.01); *G02B 6/4256* (2013.01)

(58) Field of Classification Search
CPC .. G02B 6/2937; G02B 6/29368; G02B 6/422; G02B 6/4246; G02B 6/4256; G02B 6/262; G02B 6/293; G02B 6/29361; G02B 6/32
See application file for complete search history.

(56) References Cited

U.S. PATENT DOCUMENTS

| 4,718,055 A | 1/1988 | Winzer |
| 7,231,116 B2* | 6/2007 | Tanaka ............... G02B 6/29389 385/24 |
| 2014/0334776 A1 | 11/2014 | Kato et al. |

FOREIGN PATENT DOCUMENTS

| EP | 0216211 A2 | 4/1987 |
| JP | 09178970 A | 7/1997 |

OTHER PUBLICATIONS

EESR issued in corresponding EP application No. 20 17 7159.9, dated Oct. 13, 2020.
Shinko Electric Wire Co., Ltd., "About FBG", [online], retrieved on May 30, 2019 from <http://www.shinko-ew.co.jp/products/FBG/> (with translation).

* cited by examiner

*Primary Examiner* — John Bedtelyon
(74) *Attorney, Agent, or Firm* — Greer Burns & Crain Ltd.

(57) ABSTRACT

In a wavelength selective filter, an optical fiber collimator, an interference filter, and a reflective plate are arranged in this order from front to rear along a z-axis. The collimator has a collimator lens disposed on the rear side of an optical fiber that is opened. The interference filter includes light incident and emitting surfaces, opposed with their xy-planes rotated about a y-axis at a predetermined rotation angle. The reflective plate has a front reflective surface having a normal direction along a z-axis direction, and reflects, toward the front, light incident from the front through the interference filter, to be incident onto the interference filter. The optical fiber collimator causes the input light propagating through the optical fiber from the front to be incident onto the interference filter, and converges the reflected light transmitted through the interference filter to the optical fiber and outputs the light.

12 Claims, 9 Drawing Sheets

WAVELENGTH SELECTIVE FILTER

CROSS-REFERENCE TO RELATED APPLICATION

The present application claims priority pursuant to 35 U.S.C. § 119(a) from Japanese patent application number 2019-101514, filed on May 30, 2019, the entire disclosure of which is hereby incorporated by reference herein.

BACKGROUND

Technical Field

The present disclosure relates to a wavelength selective filter that selectively transmits or reflects light in a predetermined wavelength band.

Related Art

A wavelength selective filter to be provided as an object of the present disclosure is an optical component (hereinafter, also referred to as wavelength selection element) including an optical element that selectively transmits or reflects light in a predetermined wavelength band, and is a passive component that operates without the needs for power such as electricity. The wavelength selective filter is interposed in the extension of an optical fiber, which is an optical signal transmission line in an optical communication network, and is used to shape a deteriorated signal waveform and remove noise light. For example, a wavelength selective filter, called a "wavelength-selective reflector" or the like, to be disposed on an optical signal reception side is disposed closer to the receiver out of a transmitter and the receiver disposed at two ends of the optical signal transmission line. The wavelength selective filter shapes the optical signal transmitted from the transmitter and then sends the shaped optical signal to the transmitter side. On the transmitter side, it is possible to detect disconnection or the like of the optical transmission line based on presence or absence of the optical signal from the receiver side. Additionally, it is possible to detect an abnormality on the optical transmission line from the transmitter to the receiver by checking a lack of data, a signal intensity, and the like of the optical signal returned from the receiver side. In the field of the optical communication, a Fiber Bragg Grating element (or optical fiber grating element: hereinafter, FBG element) is well known as the wavelength selection element used for the wavelength selective filter including the wavelength-selective reflector. As is well known, the FBG element is an element obtained by creating a periodic variation in the refractive index in a direction of extension of a core of an optical fiber. The operation principle and the configuration of the FBG are described in Shinko Electric Wire Co., Ltd., "About FBG", [online], retrieved on May 30, 2019 from <http://www.shinko-ew.co.jp/products/FBG/>.

SUMMARY

The FBG element widely used for the wavelength selective filter in the field of the optical communication is manufactured by using holographic interference and a phase mask to irradiate a photosensitive optical fiber with light having a periodically distributed intensity. Accordingly, Since the manufacturing process of the FBG element includes the process requiring high optical accuracy as described above, it is difficult to provide the wavelength selective filter at low cost.

The properties of the FBG element selectively reflecting wavelengths (hereinafter, also referred to as selected wavelength) are considerably sensitive, and the wavelength band of the reflected light is considerably narrow. As is seen from the wide use of the FBG element as a strain sensor, the wavelength to be selected in the FBG element varies depending on the strain. For this reason, when there is a small strain caused by a change in temperature and/or the like in the wavelength selective filter including the FBG element, the selected wavelength may deviate from the wavelength of the optical signal. This prevents light from being returned to the transmission side, and causes a wrong determination that the optical transmission line is abnormal although there is no abnormality on the optical transmission line. Thus, it is required to dispose the wavelength selective filter in a considerably stable environment. Otherwise, it is required to prepare an apparatus or facility to maintain the placement environment stable. Therefore, the wavelength selection element used for the wavelength selective filter desirably has the properties that the wavelengths to be selected are not affected by a strain and/or the like. It is needless to say that the wavelength selection element is also required to have capabilities of accurately removing the light outside the selected wavelength band.

In view of the above, an object of the present disclosure is to provide a wavelength selective filter that is suitable for being disposed in an optical communication network at lower cost.

A main aspect of the present disclosure for achieving an object described above is a wavelength selective filter through which light in a specific wavelength band in input light is output, the wavelength selective filter comprising:
   an optical fiber collimator;
   an interference filter; and
   a reflective plate, wherein
   in a three-dimensional orthogonal coordinate system having a front-rear direction being a z-axis,
   the optical fiber collimator, the interference filter, and the reflective plate are arranged on the z-axis in this order from a front side to a rear side,
   the optical fiber collimator is configured such that a collimator lens is disposed on the rear side of an optical fiber that is opened on the rear side,
   the interference filter includes a light incident surface and a light emitting surface that are two surfaces opposing each other with their xy-planes rotated about a y-axis at a predetermined rotation angle,
   the reflective plate has a reflective surface on a front surface having a normal direction along a direction of the z-axis, the reflective plate being configured to reflect, toward the front side, light incident from the front side through the interference filter along the z-axis, and cause the reflected light to be incident onto the interference filter, and
   the optical fiber collimator is configured to cause the input light propagating through the optical fiber from the front side to be incident onto the interference filter, and converge the reflected light transmitted through the interference filter to the optical fiber to output the converged reflected light.

Alternatively, there may be provided a wavelength selective filter through which light in a specific wavelength band in input light is output, the wavelength selective filter comprising:
   an optical fiber collimator;
   an interference filter; and a reflective plate, wherein in a three-dimensional orthogonal coordinate system having a front-rear direction being a z-axis, the optical fiber collimator, the interference filter, and the reflective plate are arranged on the z-axis in this order from a front side to a rear side, the optical fiber collimator includes first and second optical fibers and a collimator lens, the first and second optical fibers being opened on the rear side and positioned to be symmetrical in a direction of an x-axis with respect to the z-axis, the collimator lens being disposed on the rear side of the first and second optical fibers and having an optical axis along the z-axis, the interference filter includes a light incident surface and a light emitting surface that are two surfaces opposing each other with their xy-planes rotated about a y-axis at a predetermined rotation angle, the reflective plate has a reflective surface on a front surface having a normal direction along a direction of the z-axis, the reflective plate being configured to reflect, toward the front side, light incident from the front side through the interference filter along the z-axis, and cause the reflected light to be incident onto the interference filter, and the optical fiber collimator is configured to cause the input light propagating through the first optical fiber from the front side to be incident onto the interference filter, and converge the reflected light transmitted through the interference filter to the second optical fiber to output the converged reflected light.

In the wavelength selective filter, the reflective plate includes an optical attenuator, the optical attenuator being configured to attenuate intensity of the incident light and reflect the attenuated incident light toward the front side. The interference filter includes an optical attenuator that attenuates intensity of light in a process of transmitting the light through the interference filter in the front-rear direction.

In any of the wavelength selective filters described above, the optical fiber collimator is coupled to a front end of a housing, the interference filter and the reflective plate are held in the housing, and the housing includes an adjuster that adjusts the rotation angle in a state where the interference filter is held in the housing.

According to the present disclosure, it is possible to provide a wavelength selective filter that is suitable for being disposed in an optical communication network at lower cost. Other effects are disclosed in the following descriptions.

DETAILED DESCRIPTION

Figure 1:
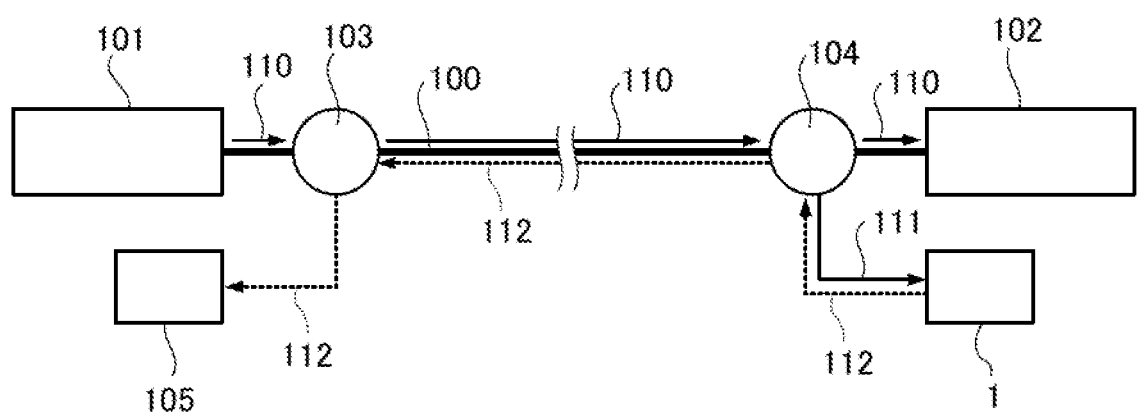
FIG. 1 is a diagram illustrating an arrangement example of a wavelength selective filter in an optical transmission line.

Embodiments of the present disclosure will be described below with reference to the accompanying drawings. In the drawings used for the following descriptions, parts that are the same or similar are given the same reference signs and descriptions thereof may be omitted. In some cases, a part given a reference sign in one drawing may not be given the reference sign in another drawing if it is unnecessary.

Embodiments of Present Disclosure

Embodiments of the present disclosure include a wavelength selective filter disposed, as a wavelength-selective reflector described above, on the reception side of an optical signal transmission line. FIG. 1 illustrates a schematic configuration of an optical transmission line including the wavelength selective filter. An optical transmission line 100 including an optical fiber extends from a transmitter 101 to a receiver 102 of an optical signal, and a wavelength selective filter 1 according to an embodiment of the present disclosure is disposed near the receiver 102 (on the reception side). In this embodiment, optical elements (hereinafter, also referred to as couplers 103 and 104) that split the optical signal are disposed near the transmission side and the reception side on the optical transmission line 100, respectively. The wavelength selective filter 1 shapes an optical signal 111, which is split by the coupler 104 on the reception side from the optical signal 110 transmitted from the transmitter 101 in a forward direction, and returns the shaped optical signal 111 toward the transmitter 101. This return light 112 follows the optical transmission line 100 in the opposite direction and is inputted by the coupler 103 on the transmission side to a detector 105, which includes a light receiving element such as a photodiode, an analyzer of a signal outputted by the light receiving element, and the like. The detector 105 measures presence or absence of the return light 112 or measures properties of the return light 112, to detect presence or absence of an abnormality in the optical transmission line 100.

The wavelength selective filters according to embodiments of the present disclosure uses an interference filter as the wavelength selection element without using an FBG element. The interference filter is formed such that a dielectric thin film is formed on a substrate made of glass or the like, and is an optical element that transmits light in a specific wavelength band and reflects light in other band. The wavelength selective filters according to the embodiments are rendered more suitable for use in optical communication by taking advantage of the properties of interference filter.

First Embodiment

Figure 2A:
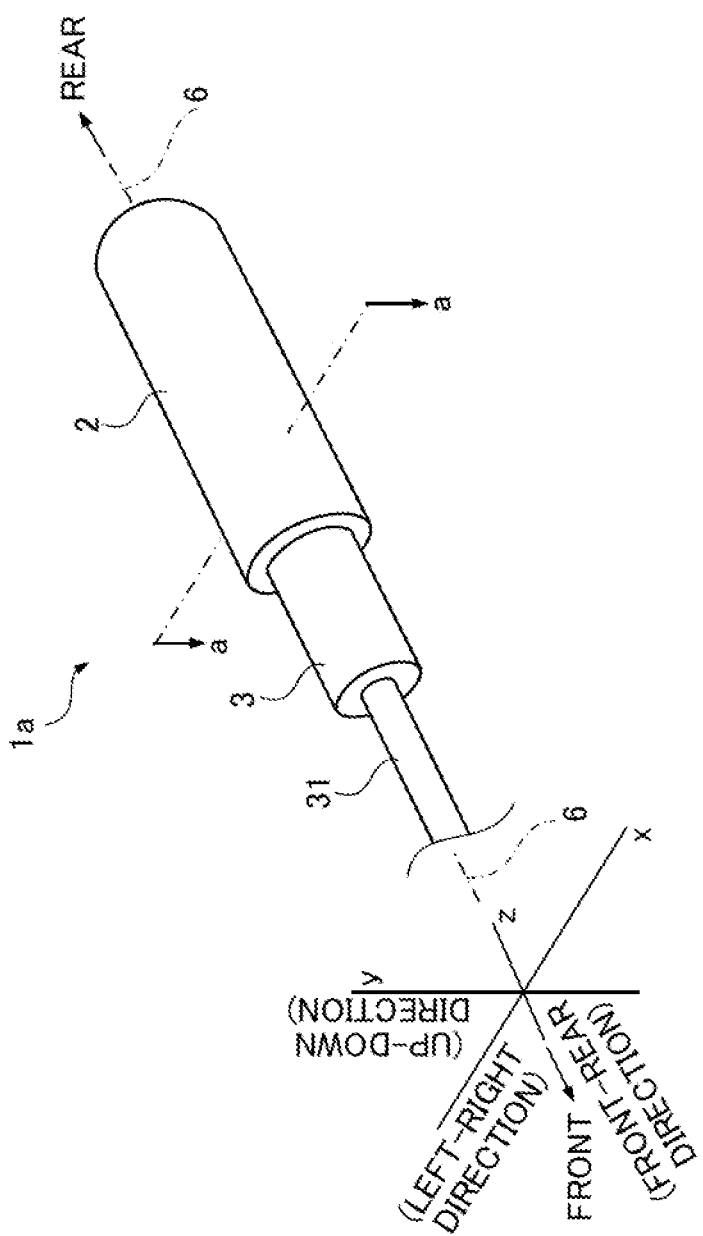
FIGS. 2A and 2B are diagrams illustrating a configuration of a wavelength selective filter according to a first embodiment of the present disclosure.
Figure 2B:
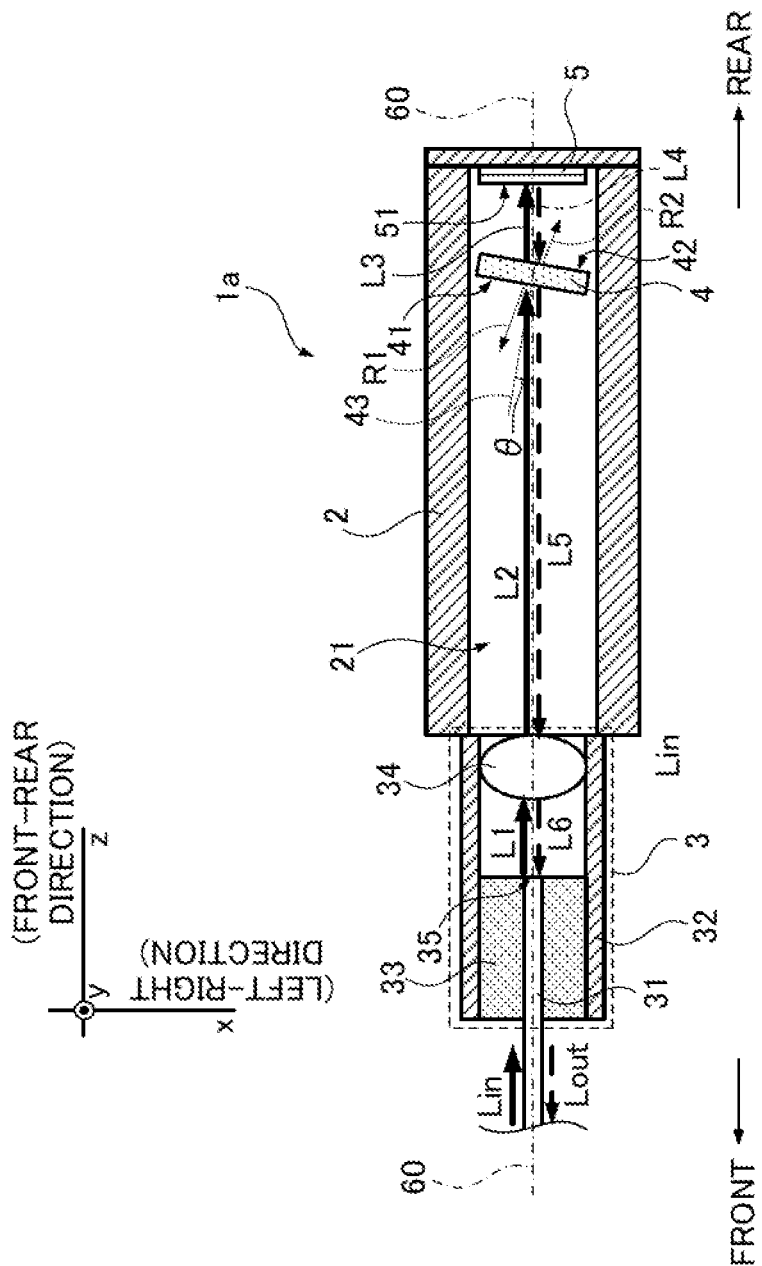

FIGS. 2A and 2B illustrate a schematic configuration of a wavelength selective filter 1a according to a first embodiment of the present disclosure. FIG. 2A is an external view of the configuration, and FIG. 2B is a longitudinal cross-sectional view corresponding to a cross-section taken along line a-a in FIG. 2A. FIG. 2B also schematically illustrates operations of the wavelength selective filter 1a. As illustrated in FIG. 2A, the wavelength selective filter according to the first embodiment (hereinafter, also referred to as the first embodiment 1a) has an external configuration in which an optical fiber collimator 3 having a cylindrical external shape is coupled to one end of a cylindrical housing 2 having the interference filter held therein. An optical fiber 31 is led out as a so-called "pigtail" from an end portion of the optical fiber collimator 3, and the coupler 104 illustrated in FIG. 1 or the like is to be coupled to a terminal end of the led-out optical fiber 31. Here, for the sake of convenience, a direction of an axis 6 of the cylindrical housing 2 is set in a front-rear direction. The front and the rear in the direction are defined assuming that the optical fiber collimator 3 is coupled to the front end of the housing 2. When an xyz-three-dimensional orthogonal coordinate system is set with a z-axis being parallel to the front-rear direction, a direction of an x-axis is a left-right direction, and a direction of a y-axis is an up-down direction. The cross-sectional view illustrated in FIG. 2B corresponds to a cross section along a zx-plane.

As illustrated in FIG. 2B, the optical fiber collimator 3 has a configuration in which a ferrule 33 holding the optical fiber 31 and a collimator lens 34 are held in a hollow cylindrical sleeve 32 coaxially with the sleeve 32, and the optical fiber 31 has an opening 35 at the rear end. The housing 2 has a cylindrical interior that is opened on the front side and closed at the rear end, and defines a hollow cylindrical space 21 extending in the front-rear direction therein. Assuming that a straight line extending in the front-rear (z-axis) direction passing through opening ends of the optical fiber 31 is an optical axis 60, an interference filter 4 and a reflective plate 5 are arranged on the optical axis 60 in this order from the front side to the rear side in the housing 2. The following descriptions are given, assuming that the z-axis is the optical axis 60 and the optical axis 60 coincides with the cylindrical axis 6 of the housing 2.

The interference filter 4 has two opposing surfaces 41 and 42 which are a light incident surface and a light emitting surface. As described above, the interference filter 4 transmits light in a specific wavelength band and reflects light of other wavelengths. Thus, when light traveling along the z-axis is incident thereon, the reflected light needs to be prevented from traveling backward along the z-axis. Accordingly, the direction of a normal 43 to the light incident surface and light emitting surface (41 and 42) in the interference filter 4 is inclined with respect to the z-axis. In this embodiment, a plane obtained by rotating an xy-plane about the y-axis at a predetermined rotation angle θ corresponds to each of the incident surface and emitting surface (41 and 42). The reflective plate 5 has a reflective surface 51 that is a front surface having a direction of a normal is along the z-axis.

Next, operations in the first embodiment 1a will be described with reference to FIG. 2B. First, when an optical signal (hereinafter, also referred to as the input light Lin) propagating through the optical fiber 31 from the front is emitted rearward from the opening of the optical fiber 31, this emitting light L1 is shaped into parallel light L2 by the collimator lens 34 and incident on the interference filter 4. The interference filter 4 transmits light L3 in a specific wavelength band from the incident light L2 toward the rear side, while reflecting light R1 in other bandwidths. The reflective plate 5 reflects the light L3 transmitted through the interference filter 4 toward the front side, and the interference filter 4 transmits light L5 in a predetermined wavelength band from this reflected light L4 while reflecting light R2 in other bandwidths. Then, the light L5 transmitted through the interference filter 4 from the rear side is converged to the opening 35 of the optical fiber 31 by the collimator lens 34. The optical fiber 31 is used to propagate light L6 incident from the rear side as output light Lout in the direction opposite to that of the input light Lin. The output light Lout joins the optical transmission line 100 through the coupler 104, and is returned toward the transmitter 101 as illustrated in FIG. 1.

Figure 3:
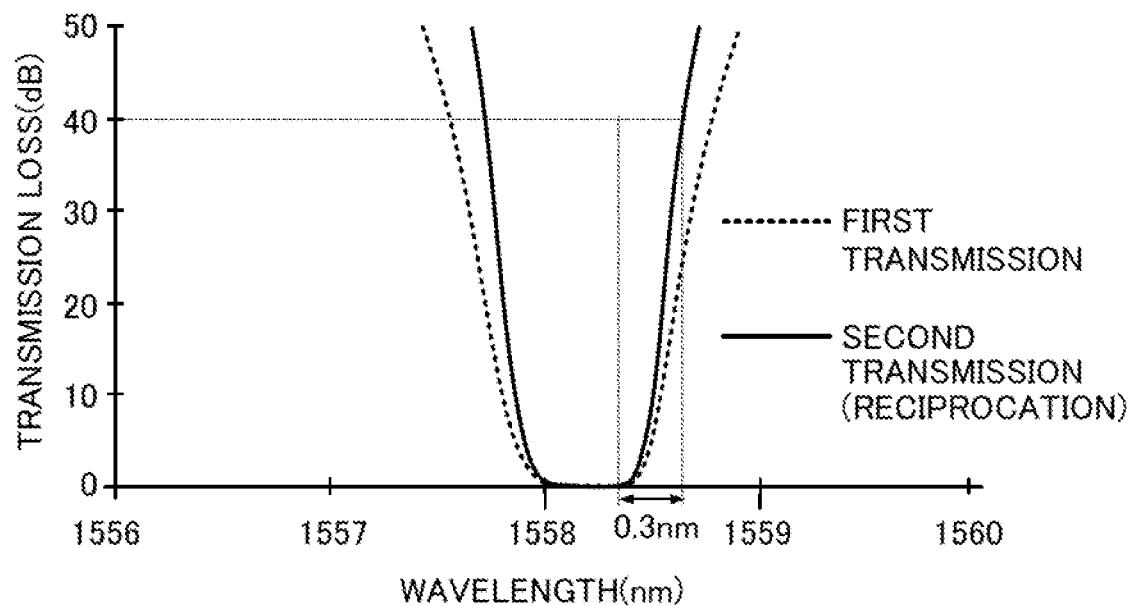
FIG. 3 is a diagram illustrating wavelength selection properties of the wavelength selective filter according to the first embodiment.

Thus, in the first embodiment 1a, it is possible to selectively extract only the light Lout in specific wavelengths from the input light Lin propagating from the optical-signal-transmission side and return the light Lout to the transmission side, with a considerably simple configuration. In the first embodiment 1a, the input light Lin is transmitted through the interference filter 4 twice. This makes it possible to substantially completely remove, in the second time of the light transmission in the direction from the rear to front, a portion of the light L3 in an unnecessary wavelength band that has not been reflected in the first time of the light transmission in the direction from the front to rear. FIG. 3 illustrates wavelength dependent properties (hereinafter, also referred to as wavelength selection properties) of the intensity of the transmitted light in the first embodiment. The interference filter used in this embodiment is formed by sequentially laminating $SiO_2$ having a thickness of 33 µm and $Ta_2O_5$ having a thickness of 19 µm on a quartz substrate, and the above-described rotation angle θ is set to 3.0°. As illustrated in FIG. 3 although the interference filter can transmit light in a predetermined band having a certain width, the interference filter slightly transmits also light outside the predetermined bandwidth in the first time of light transmission. However, by transmitting the light through the interference filter twice, the wavelength selection properties are enhanced. In this example illustrated herein, the transmission loss has been changed by about 40 dB, with only a deviation of about 0.3 nm from the selective wavelength band.

Thus, according to the first embodiment, the expensive FBG element is not used but the interference filter is used as the wavelength selection element. The combination of one interference filter and the reflective plate makes it possible to obtain substantially similar effects as those of the wavelength selective filter having a configuration in which two interference filters are arranged in series on the optical axis. That is, the excellent wavelength selection properties are obtained with cost reduction being achieved by using less number of less expensive parts. Since the wavelengths to be selected in the interference filter have a certain width, it is unnecessary to excessively control a film thickness of an interference film in the interference filter, as long as the wavelength of the optical signal is included within the transmission wavelength band. Accordingly, it is possible to reduce the cost of the parts of the interference filter as well. With respect to the placement accuracy of the interference filter and the reflective plate, any placement may be applied as long as a beam spot area of the light from the collimator lens can be included within a light incident surface area of such an optical part. This can make it possible to reduce the assembling cost of the wavelength selective filter as well. There is no significant change in wavelength selection properties caused by change in temperature and the like as in the wavelength selective filter using the FBG element. Thus, an apparatus or a facility for strictly maintaining the installation environment is no longer necessary. That is, it is possible to reduce the installation cost of the wavelength selective filter as well.

Second Embodiment

In such a multilayer film formed by laminating thin films on a substrate as the interference filter, the substantial thickness of the interference film varies with an incident angle of light, thereby changing variable wavelength selection properties. In the first embodiment, as illustrated in FIG. 2B, in order to avoid return light of an unnecessary wavelength component, the direction of normal to the film surface of the interference filter is inclined at the angle θ with respect to the z-axis, and the interference filter is mounted in the housing with the angle θ being maintained. That is, in the first embodiment, the interference filter is produced so as to obtain desired wavelength selection properties with the rotation angle θ about the y-axis having been adjusted, based on the configuration in which light is incident on the interference filter in a direction inclined thereto. In other words, if a mechanism for actively adjusting the rotation angle θ is added to the first embodiment, adjustable setting to the wavelength selection properties is enabled to some extent. With this configuration, even in a case where desired wavelength selection properties cannot be obtained, for example, due to an error in the film thickness of the interference filter, it is possible to increase an allowable error in the film thickness accuracy of the interference filter if the rotation angle θ can be easily adjusted in a state where the interference filter has been mounted in the housing. This can make it possible to provide a wavelength selective filter with excellent wavelength selection properties at lower cost. As a second embodiment of the present disclosure, a wavelength selective filter including a mechanism capable of variably setting the wavelength selection properties will be described.

Figure 4A:
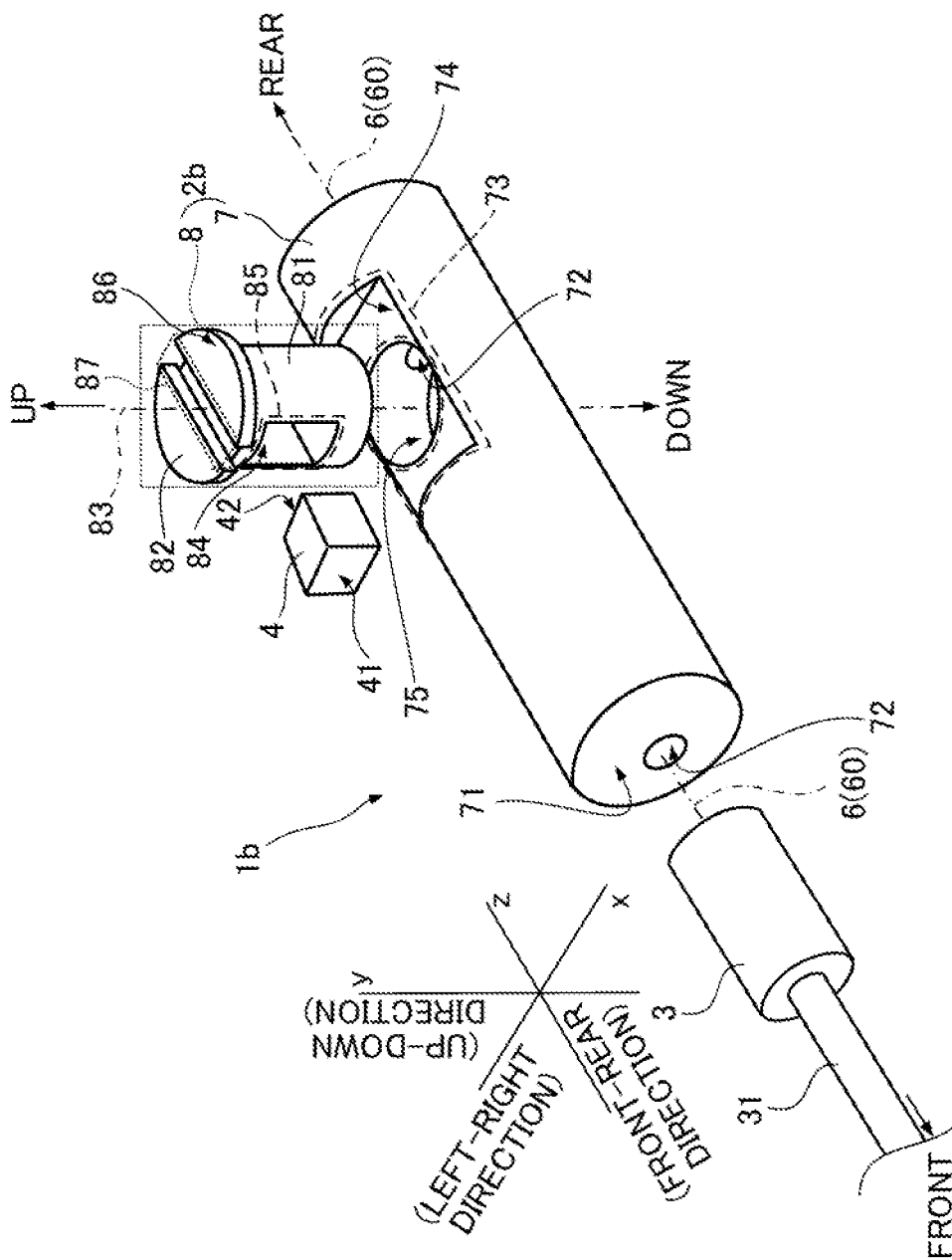
FIGS. 4A and 4B are diagrams illustrating a configuration of a wavelength selective filter according to a second embodiment of the present disclosure.
Figure 4B:
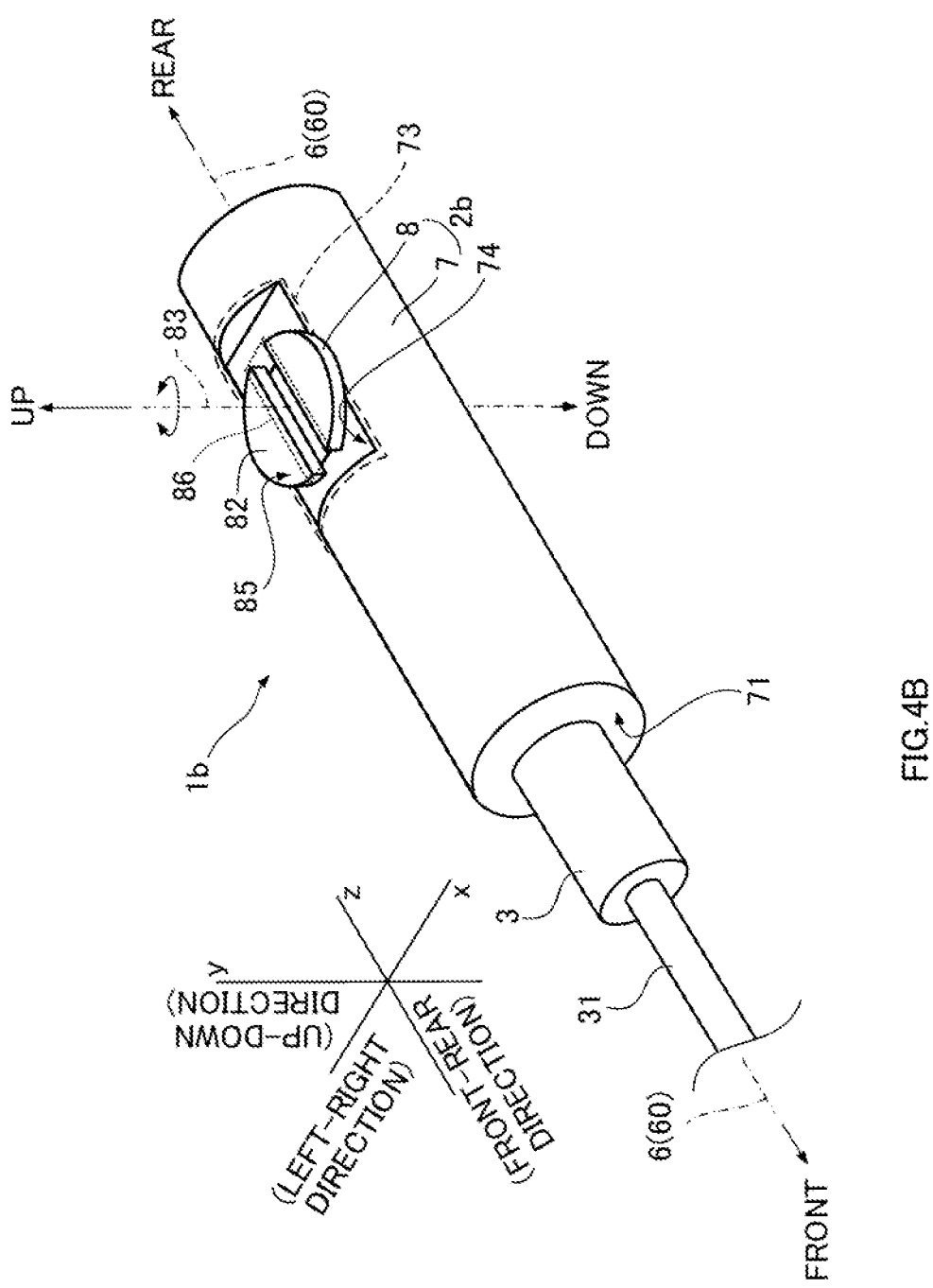

FIGS. 4A and 4B are diagrams illustrating a schematic configuration of a wavelength selective filter according to the second embodiment (hereinafter, also referred to as the second embodiment 1b). FIG. 4A is an exploded perspective view illustrating the second embodiment 1b, and FIG. 4B is a perspective view illustrating the exterior of the second embodiment 1b. As illustrated in FIG. 4A, a cylindrical housing 2b comprises: a main body portion 7 that holds the reflective plate therein and has the front end thereof coupled to the optical fiber collimator 3; and a filter holding unit 8 that holds the interference filter 4. The filter holding unit 8 has a structure for fixing the interference filter 4 to the main body portion 7 while enabling the adjustment of the rotation angle θ about the y-axis. The filter holding unit 8 has a shape in which a cylindrical body portion 81 includes a circular plate-shaped head portion 82 that has a diameter greater than that of the body portion 81 and is formed on either of the upper and lower end surfaces of the body portion 81. A hole (hereinafter, also referred to as filter housing portion 84) passing through in a direction orthogonal to a cylindrical axis 83 of the cylindrical body portion 81 is formed in the side surface of the body portion 81 to house the interference filter 4 therein. In this embodiment, an opening 85 of the filter housing portion 84 is in a rectangular shape corresponding to the shape of the interference filter 4 in a cuboid shape or in a rectangular flat plate shape. Then, the interference filter 4 is inserted into the filter housing portion 84 such that the light incident surface and light emitting surface (41 and 42) thereof are exposed from the rectangular opening 85 in this filter housing portion 84.

The main body portion 7 has a hollow cylindrical shape, and the optical fiber collimator 3 is coupled to the front end surface 71 side thereof, while the reflective plate is held at the rear end in the hollow internal space thereof. It is also assumed here that the optical axis 60 in the optical fiber collimator 3 coincides with the cylindrical axis 6 of this cylindrical main body portion 7. A hole (hereinafter, also referred to as the lateral hole 72) has a circular cross-section in the front end surface 71 of the main body portion 7, and is formed in a direction coinciding with the direction of the cylindrical axis 6, and the optical fiber collimator 3 is coupled to the front end surface 71 by a method such as welding such that the optical axis 60 of the optical fiber collimator 3 coincides with the cylindrical axis 6 of the main body portion 7.

Assuming that the head portion 82 side in the filter holding unit 8 is the upper side, the upper side-surface of the main body portion 7 is partially cut out to form an area 73 in which the interference filter is to be arranged at the center in the front-rear direction and a flat plane 74 having a normal in the up-down direction is formed. In the area corresponding to the flat plane 74 (hereinafter, also referred to as the cut-out portion 73), a circular hole (hereinafter, also referred to as the vertical hole 75) is formed with its depth direction set in the up-down direction, and the above-described lateral hole 72 in the front-rear direction is opened in an inner surface of the vertical hole 75. Although the vertical hole 75 in the embodiment described herein is bottomed, the vertical hole 75 may also be a through-hole.

The body portion 81 of the filter holding unit 8 is to be inserted into the vertical hole 75. In a state of having been inserted in the vertical hole 75, the body portion 81 is slidably in contact with the inner surface of the vertical hole 75. When the body portion 81 of the filter holding unit 8 has been inserted in the vertical hole 75, a lower surface of the head portion 82 of the filter holding unit 8 is brought into contact with the flat plane 74 of the main body portion 7, and the filter holding unit 8 is mounted to the main body portion 7 without a gap, as illustrated in FIG. 4B. At this time, the opening 85 in the filter housing portion 84 faces the opening of the lateral hole 72 in the vertical hole 75, so that a light ray traveling along the optical axis 60 is transmitted through the interference filter 4. When the body portion 81 inserted in the vertical hole 75 is rotated about the cylindrical axis 83, the light incident surface and light emitting surface (41 and 42) in the interference filter 4 are inclined with respect to the optical axis 60. In the filter holding unit 8, a groove 87 is formed on a top surface 86 of the head portion 82 as a structure for rotating the body portion 81. When a tool such as a flathead screwdriver is fitted with the groove 87 in a state where the filter holding unit 8 has been mounted to the main body portion 7, and then the head portion 82 is rotated about the cylindrical axis 83 of the body portion 81, the interference filter 4 mounted to the body portion 81 can intersect with the optical axis 60 at the foregoing rotation angle θ. When the interference filter 4 is fixed in a state of having been adjusted at a predetermined rotation angle θ, the head portion 82 may be fixed to the flat plane 74 of the main body portion 7 by a method such as laser welding. In the second embodiment 1b, the mechanism for variably adjusting the rotation angle θ of the interference filter 4 and the structure for holding the interference filter using the filter holding unit are not limited to the configurations and the structures illustrated in FIGS. 4A and 4B.

Figure 5:
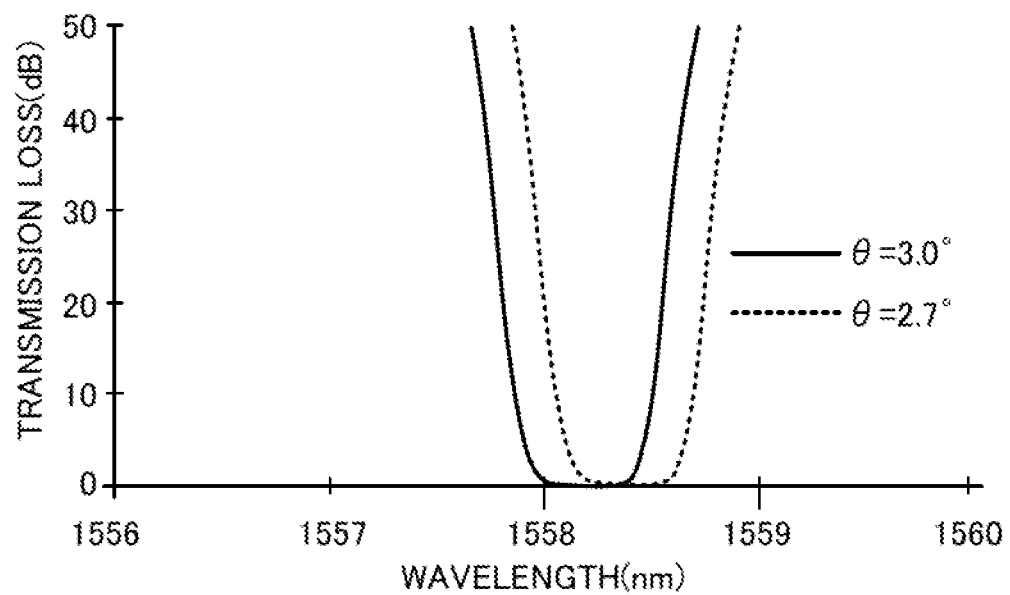
FIG. 5 is a diagram illustrating wavelength selection properties of the wavelength selective filter according to the second embodiment.

Next, the wavelength selection properties in the second embodiment 1b are examined. FIG. 5 illustrates a relationship between the rotation angle θ of the interference filter 4 and the wavelength selection properties in the second embodiment 1b. As illustrated in FIG. 5, it can be understood that, when comparing with a selective wavelength band using the rotation angle θ=2.7°, a selective wavelength band using the rotation angle θ=3.0° is shifted to a short wavelength side. In this example, the selective wavelength band is shifted to the short wavelength side by 0.167 nm. Accordingly, in the second embodiment 1b, it is possible to variably control the wavelength selection properties by adjusting the rotation angle θ even after the interference filter 4 has been mounted into the housing 2, and it is possible to accurately adjust the wavelength selection properties even if there is some error in a film thickness of the interference film in the interference filter 4.

Third Embodiment

In an optical communication using an optical fiber, light serving as a data transmission medium attenuates during its propagation. Thus, the light needs to be amplified at predetermined intervals. A device that amplifies the light is an optical amplifier. Examples of such an optical amplifier include a well-known self-amplifying type optical amplifier (EDFA) using an erbium-doped fiber (EDF). In a case where the optical amplifier is disposed on the optical transmission line 100 illustrated in FIG. 1, the wavelength selective filter 1 results in performing the wavelength selection operation against the amplified light. Thus, the light returning from the wavelength selective filter 1 to the transmitter 101 side may have an excessive intensity. That is, intense light exceeding a measurement limit of the detector 105 may be returned. Thus, as a third embodiment, a wavelength selective filter having a function of attenuating the light selectively transmitted therethrough (optical attenuation function) will be described.

Figure 6:
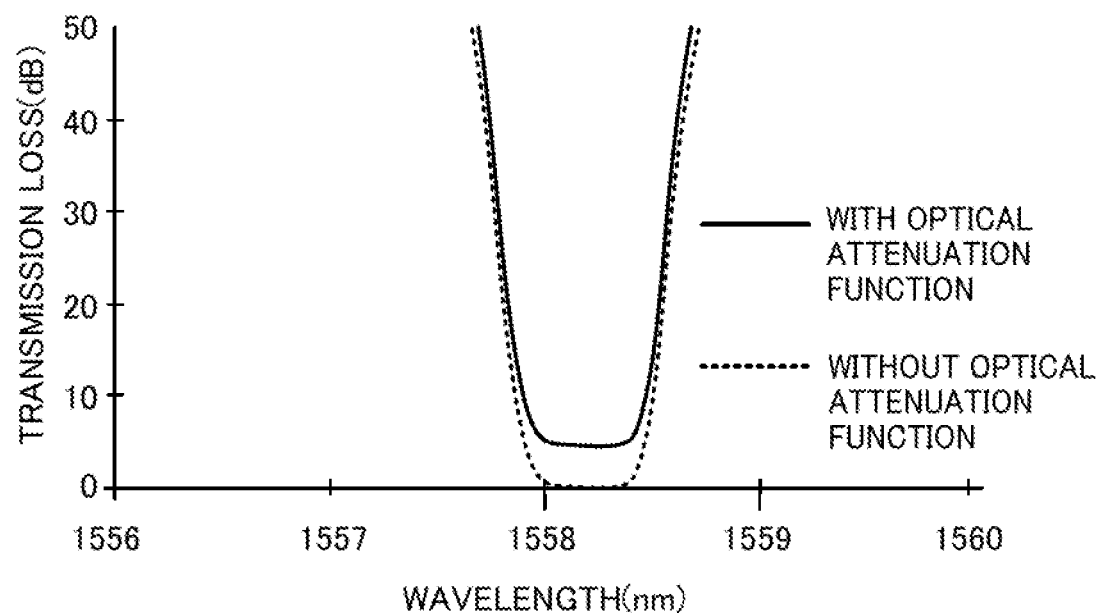
FIG. 6 is a diagram illustrating wavelength selection properties of a wavelength selective filter according to a third embodiment of the present disclosure.

The optical attenuation function may be provided in either of the reflective plate and the interference filter. The reflective plate may include a so-called "mirror glass" to provide the optical attenuation function to the reflective plate. The mirror glass has a configuration in which a translucent metallic thin film is formed by depositing tin, silver, chrome, or the like on a glass substrate, and the mirror glass attenuates the intensity of the reflected light by partially transmitting the incident light. The light transmitted through the mirror glass can be absorbed by an inner surface of the housing. On the other hand, to provide the optical attenuation function to the interference filter, a thin film serving as an ND filter may be laminated in the interference filter. Needless to say, it is also possible to dispose the ND filter on the front surface of the reflective plate or form the above-described metallic thin film on either the front surface or rear surface of the interference filter. FIG. 6 illustrates the properties of the wavelength selective filter provided with the optical attenuation function. There are illustrated the properties of the wavelength selective filter with the reflective plate including the mirror glass. When comparing with the wavelength selective filter without optical attenuation function, the wavelength selective filter with the optical attenuation function has a greater loss in the selective wavelength band. That is, the intensity of the light outputted from the wavelength selective filter is attenuated. Needless to say, it is clear that similar effects can be obtained by adding the optical attenuation function to the wavelength selective filter by using a configuration other than the reflective plate including the mirror glass.

Other Embodiment

Figure 7:
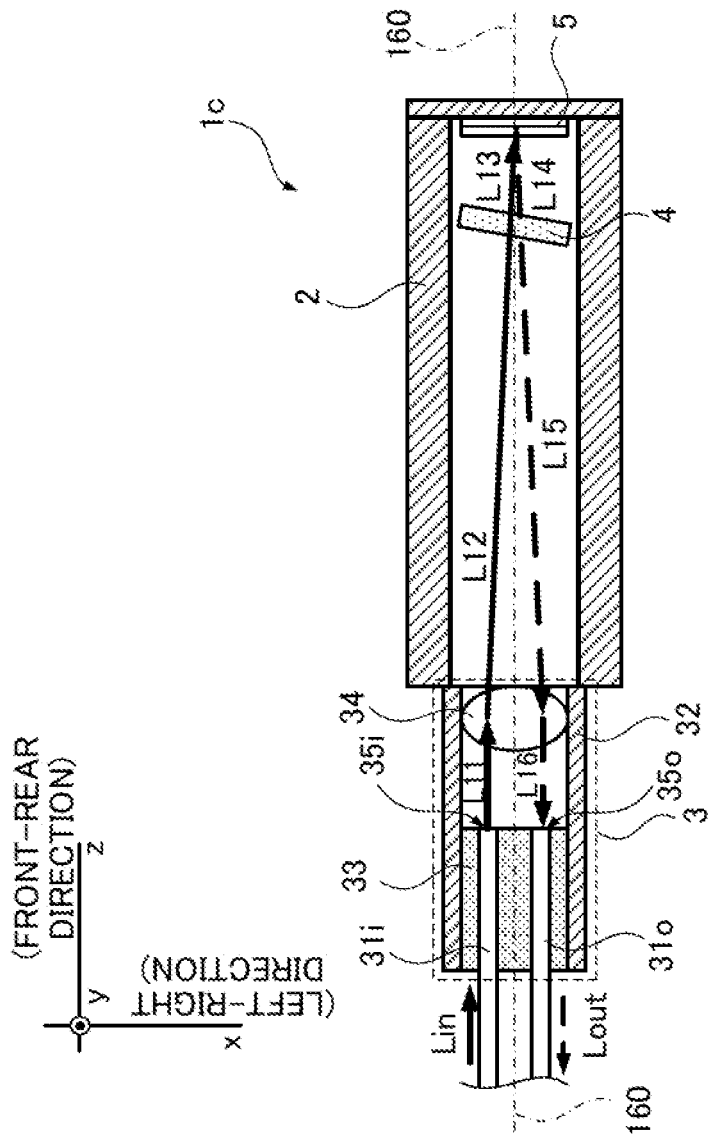
FIG. 7 is a diagram illustrating a configuration of a wavelength selective filter according to another embodiment of the present disclosure.

In the wavelength selective filters according to the above-described embodiments, light is inputted from a single optical fiber, and light in a predetermined wavelength band is outputted from the same optical fiber. Needless to say, it is also possible to use a so-called "panda fiber" in which two optical fibers are arranged side by side in a ferrule to input light from one optical fiber and output light from the other optical fiber. FIG. 7 illustrates a configuration of a wavelength selective filter 1c including two optical fibers. FIG. 7 illustrates the wavelength selective filter 1c in a vertical cross-sectional view corresponding to a zx-plane. Two optical fibers (31i and 31o) are held side by side in the x-axis (left-right) direction in a single ferrule 33, and a direction passing through the center in the left-right direction between openings (35o and 35i) of the two optical fibers (31i and 31o) and extending in the front-rear direction coincides with an optical axis 160 of the collimator lens 34. With this configuration, light Lin propagating through the one optical fiber 31i is emitted rearward from the opening 35i of the optical fiber 31i and then follows optical paths (L11 to L13) in the forward direction illustrated in FIG. 7 to reach the reflective plate 5. The reflective plate 5 reflects the incident light L13 traveling from the front side, and this reflected light L14 follows optical paths (L14 to L16) symmetrical in the left-right direction with respect to the optical paths (L11 to L13) in the forward direction to be converged to the opening 35o of the other optical fiber 31o. Then, the light L16 having converged and been incident onto the other optical fiber 31o propagates through the optical fiber 31o as output light Lout.

The above embodiments of the present disclosure are simply for facilitating the understanding of the present disclosure and are not in any way to be construed as limiting the present disclosure. The present disclosure may variously be changed or altered without departing from its gist and encompass equivalents thereof.

What is claimed is:

1. A wavelength selective filter through which light in a specific wavelength band in input light Lin in a certain wavelength band is output, the wavelength selective filter comprising:
    an optical fiber collimator;
    an interference filter; and
    a reflective plate, wherein
    in a three-dimensional orthogonal coordinate system having a front-rear direction being a z-axis,
    the optical fiber collimator, the interference filter, and the reflective plate are arranged on the z-axis in this order from a front side to a rear side,
        the optical fiber collimator is configured such that a collimator lens is disposed on the rear side of a single optical fiber that is opened on the rear side,
        the input light Lin propagating through the optical fiber from the front wide is emitted rearward from the optical fiber collimator as light L2,
        the light L2 is transmitted through the interference filter and emitted rearward as light L3,
        the light L3 is reflected forward by the reflective plate as light L4,
        the light L4 is transmitted through the interference filter and emitted forward as light L5,
        the light L5 is emitted forward from the optical fiber collimator as output light Lout, and
        the output light Lout propagates forward through the optical fiber,
        the interference filter includes a light incident surface and a light emitting surface that are two surfaces opposing each other with their xy-planes rotated about a y-axis at a predetermined rotation angle, the reflective plate has a reflective surface on a front surface having a normal direction along a direction of the z-axis, the reflective plate being configured to reflect, toward the front side, the light L3 incident from the front side through the interference filter along the z-axis, as the light L4 and cause the light L4 to be incident onto the interference filter, the optical fiber collimator is configured to cause the input light Lin propagating through the optical fiber from the front side to be incident onto the interference filter as the light L2, and converge the light L5 transmitted through the interference filter to the optical fiber to output the converged reflected light as the output light Lout, and the light L2 is transmitted through the interference filter and emitted as the light L3, and the light L4 is transmitted through the interference filter and emitted as the light L5, to thereby remove light in a wavelength band other than the specific wavelength band from the input light Lin.

2. The wavelength selective filter according to claim 1, wherein
the reflective plate includes an optical attenuator, the optical attenuator being configured to attenuate intensity of the incident light and reflect the attenuated incident light toward the front side.

3. The wavelength selective filter according to claim 2, wherein
the optical fiber collimator is coupled to a front end of a housing,
the interference filter and the reflective plate are held in the housing, and
the housing includes an adjuster that adjusts the rotation angle in a state where the interference filter is held in the housing.

4. The wavelength selective filter according to claim 1, wherein
the interference filter includes an optical attenuator that attenuates intensity of light in a process of transmitting the light through the interference filter in the front-rear direction.

5. The wavelength selective filter according to claim 4, wherein
the optical fiber collimator is coupled to a front end of a housing,
the interference filter and the reflective plate are held in the housing, and
the housing includes an adjuster that adjusts the rotation angle in a state where the interference filter is held in the housing.

6. The wavelength selective filter according to claim 1, wherein
the optical fiber collimator is coupled to a front end of a housing,
the interference filter and the reflective plate are held in the housing, and
the housing includes an adjuster that adjusts the rotation angle in a state where the interference filter is held in the housing.

7. A wavelength selective filter through which light in a specific wavelength band in input light Lin in a certain wavelength band is output, the wavelength selective filter comprising:
an optical fiber collimator;
an interference filter; and
a reflective plate, wherein in a three-dimensional orthogonal coordinate system having a front-rear direction being a z-axis, the optical fiber collimator, the interference filter, and the reflective plate are arranged on the z-axis in this order from a front side to a rear side, the optical fiber collimator includes first and second optical fibers and a collimator lens, the first and second optical fibers being opened on the rear side and positioned to be symmetrical in a direction of an x-axis with respect to the z-axis, the collimator lens being disposed on the rear side of the first and second optical fibers and having an optical axis along the z-axis, the input light Lin propagating through the first optical fiber from the front side is emitted rearward from the optical fiber collimator as light L12, the light L12 is transmitted through the interference filter and emitted rearward as light L13, the light L13 is reflected forward by the reflective plate as light L14, the light L14 is transmitted through the interference filter and emitted forward as light L15, the light L15 is emitted forward from the optical fiber collimator as output light Lout, and the output light Lout propagates forward through the second optical fiber, the interference filter includes a light incident surface and a light emitting surface that are two surfaces opposing each other with their xy-planes rotated about a y-axis at a predetermined rotation angle, the reflective plate has a reflective surface on a front surface having a normal direction along a direction of the z-axis, the reflective plate being configured to reflect, toward the front side, the light L13 incident from the front side through the interference filter along the z-axis, as the light L14, and cause the light L14 to be incident onto the interference filter, the optical fiber collimator is configured to cause the input light Lin propagating through the first optical fiber from the front side to be incident onto the interference filter as the light L12, and converge the light L15 transmitted through the interference filter to the second optical fiber to output the converged reflected light as the output light Lout, and the light L12 is transmitted through the interference filter and emitted as the light L13, and the light L14 is transmitted through the interference filter and emitted as the light L15, to thereby remove light in a wavelength band other than the specific wavelength band from the input light Lin.

8. The wavelength selective filter according to claim 7, wherein
the reflective plate includes an optical attenuator, the optical attenuator being configured to attenuate intensity of the incident light and reflect the attenuated incident light toward the front side.

9. The wavelength selective filter according to claim 8, wherein
the optical fiber collimator is coupled to a front end of a housing,
the interference filter and the reflective plate are held in the housing, and
the housing includes an adjuster that adjusts the rotation angle in a state where the interference filter is held in the housing.

10. The wavelength selective filter according to claim 7, wherein the interference filter includes an optical attenuator that attenuates intensity of light in a process of transmitting the light through the interference filter in the front-rear direction.

11. The wavelength selective filter according to claim 10, wherein the optical fiber collimator is coupled to a front end of a housing, the interference filter and the reflective plate are held in the housing, and the housing includes an adjuster that adjusts the rotation angle in a state where the interference filter is held in the housing.

12. The wavelength selective filter according to claim 7, wherein the optical fiber collimator is coupled to a front end of a housing, the interference filter and the reflective plate are held in the housing, and the housing includes an adjuster that adjusts the rotation angle in a state where the interference filter is held in the housing.

\* \* \* \* \*